(12) United States Patent
Tomita

(10) Patent No.: US 7,916,813 B2
(45) Date of Patent: Mar. 29, 2011

(54) RECEIVER DEVICE

(75) Inventor: Kazuhiro Tomita, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 912 days.

(21) Appl. No.: 11/149,289

(22) Filed: Jun. 10, 2005

(65) Prior Publication Data
US 2006/0209992 A1    Sep. 21, 2006

(30) Foreign Application Priority Data
Mar. 16, 2005 (JP) .................... 2005-075779

(51) Int. Cl.
*H03D 3/00* (2006.01)

(52) U.S. Cl. ........ 375/334; 375/295; 375/316; 375/261; 375/325

(58) Field of Classification Search ............... 375/316
See application file for complete search history.

(56) References Cited

U.S. PATENT DOCUMENTS

| | | | | |
|---|---|---|---|---|
| 4,425,584 A | * | 1/1984 | Hirota et al. ............... | 386/22 |
| 5,530,929 A | * | 6/1996 | Lindqvist et al. ............ | 455/324 |
| 5,761,615 A | * | 6/1998 | Jaffee ..................... | 455/314 |
| 6,005,896 A | * | 12/1999 | Maruyama ................. | 375/295 |
| 6,233,444 B1 | * | 5/2001 | Nakanishi ................. | 455/313 |
| 6,876,844 B1 | * | 4/2005 | Wong ...................... | 455/316 |
| 2003/0190901 A1 | * | 10/2003 | Miya et al. ................ | 455/265 |

FOREIGN PATENT DOCUMENTS

JP    61-099447    5/1986

OTHER PUBLICATIONS

John F. Wilson, et al.; "A Single-Chip VHF and UHF Receiver for Radio Paging"; IEEE Journal of Solid-State Circuits, vol. 26, No. 12, Dec. 1991.

* cited by examiner

*Primary Examiner* — Shuwang Liu
*Assistant Examiner* — Lihong Yu
(74) *Attorney, Agent, or Firm* — Arent Fox LLP

(57) ABSTRACT

A frequency converter converts a high frequency signal transmitted in a frequency shift keying scheme into an intermediate frequency signal having a predetermined frequency, to output the intermediate frequency signal therefrom. An amplitude limiter limits an amplitude of an output signal from the frequency converter for output. An orthogonal demodulator includes: a first signal generator which generates a pair of first local oscillation signals of which frequencies are k multiple of the predetermined frequency and of which phases are orthogonal to each other, k being an odd integer equal to or greater than 3. I-side and Q-side mixers each mix an output signal from the amplitude limiter and each of the pair of first local oscillation signals to output a mixed signal therefrom. The orthogonal demodulator generates a demodulation signal based on output signals from the I-side and Q-side mixers.

10 Claims, 11 Drawing Sheets

RECEIVER DEVICE

CROSS REFERENCE TO RELATED APPLICATION

This application is based upon and claims the benefit of priority from Japanese Patent Application No. 2005-075779, filed on Mar. 16, 2005, the entire contents of which are incorporated herein by reference.

BACKGROUND OF THE INVENTION

1. Field of the Invention

The present invention relates to a FSK (Frequency Shift Keying) receiver device for use in radio communication using the frequency shift keying.

2. Description of the Related Art

A low-cost FSK communication system is often used in narrow-band and near-field radio communication. In particular, Low-IF type FSK receiver device is widely used in recent years because the Low-IF type FSK receiver device can incorporate a band pass filter thereinto to thereby reduce cost. Typically, in the FSK receiver devices, a demodulation scheme is adopted in which an input signal (radio signal) is amplitude-limited by a limiter amplifier and the like and then a demodulation signal is obtained by quadrature detection using an external phase shifter. As a low cost scheme cheaper than the above mentioned one, a demodulation scheme is known in which a demodulation signal is obtained by performing differentiation and multiplication processes for complex I/Q baseband signals (output signals from I/Q downconverter) (see, for example, "A Single-Chip VHF and UHF Receiver for Radio Paging", by John F. Wilson, Richard Youell, Tony H. Richards, Gwilym Luff, and Ralf Pilaski, IEEE JOURNAL OF SOLID-STATE CIRCUITS, VOL. 26, NO. 12, Dec. 1991).

Further, for a communication scheme using digital frequency modulations, a delay detection scheme is known which can efficiently detect and demodulate a signal transmitted in the state that a frequency shift is lowered in order to use the frequency spectrum effectively (for example, see Japanese Unexamined Patent Application Publication NO. Sho 61-99447).

In the demodulation scheme in which a demodulation signal is obtained by quadrature detection using an external phase shifter, the external phase shifter costs a lot as compared to others. For this reason, this scheme is not suitable for the FSK receiver device of which cost reduction is strongly demanded. Also, in such a scheme, the external phase shifter may need to be adjusted at the time of shipping the FSK receiver device, which results in a disadvantage in the scheme mentioned above.

The demodulation scheme, in which a demodulation signal is obtained by performing differentiation and multiplication processes for complex I/Q baseband signals, is suitable for a case where the modulation index is large as in a conventional pager. But, when the modulation index is small (for example, ECHONET: modulation index is 1.75 when frequency shift is 2.1 kMHz and data rate is 2.4 kbps), the variation in the demodulation signal is large. In other words, the duty of the demodulation signal deviates, resulting in large jitter. For this reason, it is difficult for a baseband IC in a later stage to be synchronized with the demodulation signal.

SUMMARY OF THE INVENTION

The object of the present invention is to provide a FSK receiver device capable of generating a demodulation signal with high accuracy and at low cost even when the modulation index is small.

According to an aspect of the receiver device of the present invention, a frequency converter converts a high frequency signal transmitted in a frequency shift keying scheme into an intermediate frequency signal having a predetermined frequency, to output the intermediate frequency signal therefrom. An amplitude limiter limits an amplitude of an output signal from the frequency converter to output the amplitude-limited signal. A first signal generator in an orthogonal demodulator generates a pair of first local oscillation signals of which frequencies are k (k is an odd integer equal to or greater than 3) multiple of the predetermined frequency and of which phases are orthogonal to each other. An I-side mixer in the orthogonal demodulator mixes an output signal from the amplitude limiter and one of the first local oscillation signals to output the mixed signal therefrom. A Q-side mixer in the orthogonal demodulator mixes the output signal from the amplitude limiter and the other of the first local oscillation signals to output the mixed signal therefrom. The orthogonal demodulator generates a demodulation signal based on output signals from the I-side and Q-side mixers.

By setting the frequency of the first local oscillation signals by k multiple of the predetermined frequency, the orthogonal demodulator generates the demodulation signal using the k-th order harmonics component (corresponding to the output signal from the amplitude limiter multiplied by k) of the output signal from the amplitude limiter. Since this is equivalent to multiplying the modulation index by k, it is possible to suppress variation in the demodulation signal even when the modulation index is small. On the other hand, since a multiplier for multiplying the output signal from the amplitude limiter by k is not required, it is possible to improve the accuracy of the demodulation signal at low cost. Thus, it is possible to contribute to high quality and economization of the FSK communication system. In addition, although not only odd-th harmonics components but also even-th harmonics components appear in the output signal from the amplitude limiter, since levels of the even-th harmonics components are very low as compared to those of the odd-th harmonics components, it is not suitable for use in the orthogonal demodulator.

In a preferred example of the aspect of the receiver device according to the present invention, an oscillator generates a basic oscillation signal having frequency of n·m·k (m and n are integers equal to or greater than 2) multiple of the predetermined frequency. A second signal generator in the frequency converter generates a second local oscillation signal based on the basic oscillation signal. A mixer in the frequency converter mixes the high frequency signal and the second local oscillation signal to output the mixed signal therefrom. A divider in the first signal generator divides the basic oscillation signal by m to output the divided signal as a divided oscillation signal. A phase shifter in the first signal generator generates the first local oscillation signals by dividing the divided oscillation signal by n. With such a configuration, it is possible to communize the basic oscillation signal used in signal generation operations of the first and second signal generators. As a result, it is possible to reduce cost as compared to a case in which separate oscillators are provided to the first and second signal generators, respectively.

In a preferred example of the aspect of the receiver device according to the present invention, the divider in the first signal generator includes a counter which performs a counting operation in synchronization with the basic oscillation signal. The divider outputs, as the divided oscillation signal, a signal inverted every time the counter performs m counting operations. As a result, by using the counter, the divider that divides the basic oscillation signal by m can be constructed with ease.

In a preferred example of the aspect of the receiver device according to the present invention, the m is a-th (where a is an integer equal to or greater than 2) power of 2. The divider in the first signal generator includes a number 'a' of toggle type flip-flops that are connected in cascade. The divider inputs the basic oscillation signal to a first-stage toggle type flip-flop of the toggle type flip-flops and then outputs a signal output from a last-stage toggle type flip-flop of the toggle type flip-flops as the divided oscillation signal. By using the number 'a' of cascade connected toggle type flip-flops, as compared to a case in which a single counter is used, it is possible to realize the divider that divides the basic oscillation signal by m with the simplified configuration. Also, it is possible to make the duty of the divided oscillation signal exactly 50%.

In a preferred example of the aspect of the receiver device according to the present invention, the m is 2. The divider in the first signal generator includes a toggle type flip-flop which inverts an output signal in synchronization with the basic oscillation signal. The divider outputs the output signal from the toggle type flip-flop as the divided oscillation signal. By using the toggle type flip-flop, it is possible to construct the divider that divides the basic oscillation signal by 2 with ease and to make the duty of the divided oscillation signal exactly 50%.

In a preferred example of the aspect of the receiver device according to the present invention, the n is b-th (where b is a positive integer) power of 2. The phase shifter in the first signal generator includes a b-bit Johnson counter which performs a counting operation in synchronization with the divided oscillation signal. The phase shifter generates the first local oscillation signals based on bit value signals of the Johnson counter. Since, in case where n is 4 (i.e., when b is 2), for example, the first and second bit value signals output by the 2-bit Johnson counter have frequencies each of which is equal to ¼ of the divided oscillation signal, each of the bit value signals is shifted exactly 90° in phase. Therefore, it is possible to use the first and second bit value signals of the Johnson counter as one and the other of the first local oscillation signals, respectively. In addition, the Johnson counter carries out counting operations in synchronization with any one of the rising and falling edges of the divided oscillation signal. As a result, it is possible to make the duty of the first oscillation signals exactly 50% irrespective of the duty of the divided oscillation signal, by using the bit value signals of the Johnson counter as the first oscillation signals.

In a preferred example of the aspect of the receiver device according to the present invention, the n is 4. The phase shifter in the first signal generator includes a toggle type flip-flop which inverts an output signal in synchronization with the basic oscillation signal, and a flip-flop circuit which inverts first and second output signals in synchronization with the rising and falling edges of the output signal from the toggle type flip-flop, respectively. The phase shifter generates the first local oscillation signal based on the first and second output signals from the flip-flop circuit. The output signal from the toggle type flip-flop has a frequency equal to ½ of the divided oscillation signal, and therefore the duty of the output signal from the toggle type flip-flop will be exactly 50%. As a result, for example, in a case where the flip-flop circuit inverts the first output signal for every rising edge of the output signal from the toggle type flip-flop and the second output signal for every falling edge of the output signal from the toggle type flip-flop, both of the first and second output signals from the flip-flop circuit have frequencies that are equal to ¼ of the divided oscillation signal and are shifted exactly 90° in phase. As a result, it is possible to use the first and second output signals from the flip-flop circuit as the first local oscillation signals. It is therefore possible to make the duty of the first oscillation signals exactly 50% irrespective of the duty of the divided oscillation signal, by using the first and second output signals from the flip-flop circuits as the first local oscillation signals.

In a preferred example of the aspect of the receiver device according to the present invention, the n is 2. The phase shifter in the first signal generator includes a flip-flop circuit which inverts first and second output signals in synchronization with the rising and falling edges of the divided oscillation signal. The phase shifter generates the first local oscillation signals based on the first and second output signals from the flip-flop circuit. For example, in a case where the flip-flop circuit inverts the first output signal for every rising edge of the divided oscillation signal and the second output signal for every falling edge of the divided oscillation signal, if the duty of the divided oscillation signal is 50%, both of the first and second output signals from the flip-flop circuit have frequencies equal to ½ of the divided oscillation signal and are shifted exactly 90° in phase. As a result, when the duty of the divided oscillation signal is 50%, it is possible to use the first and second output signals from the flip-flop circuit as the first local oscillation signal.

In a preferred example of the aspect of the receiver device according to the present invention, a band-pass filter or a high-pass filter is provided between the amplitude limiter and the orthogonal demodulator. A center frequency of the band-pass filter is k multiple of the predetermined frequency. The high-pass filter has a pass band including a frequency which is k multiple of the predetermined frequency. Since the amplitude of the harmonics component of the output signal of the amplitude limiter becomes smaller gradually as the order of the harmonics component goes up, the harmonics components other than the k-th order harmonics component, in particular the lower order harmonics components than the k-th order harmonics component are apt to interfere. Because the harmonics components are sufficiently separated from each other, it is possible to remove unnecessary harmonics components by forming a simple band-pass filter or a high-pass filter having 1-th or 2-th order. As a result, it contributes to improvement in accuracy of the demodulation signals.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Figure 1:
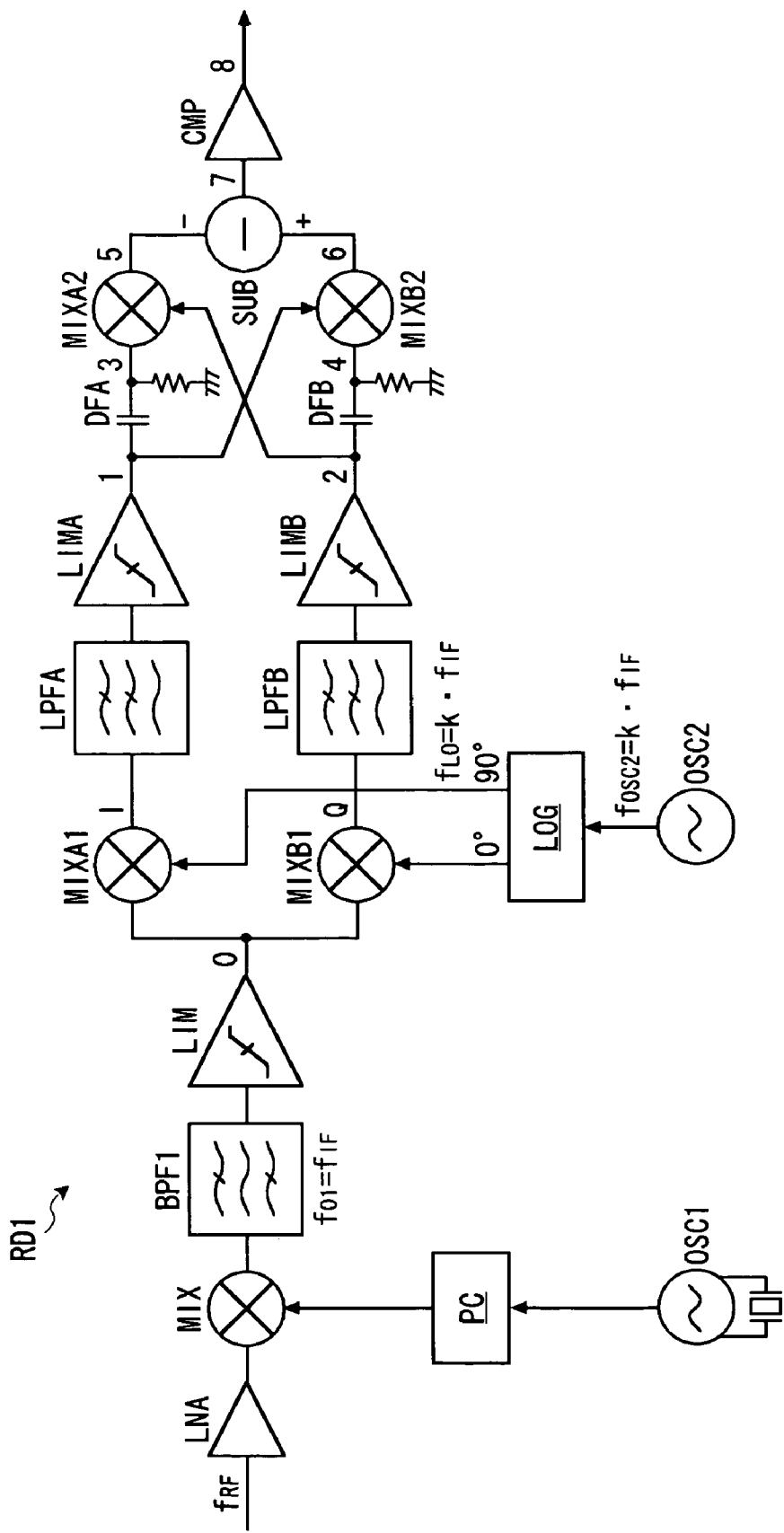
FIG. 1 is a block diagram illustrating a first embodiment of a receiver device according to the present invention.

Hereinafter, embodiments of the present invention will be described using the drawings. FIG. 1 is a block diagram of a receiver device according to the first embodiment of the present invention. An FSK receiver device RD1 includes a low-noise amplifier LNA, a mixer MIX, a PLL circuit PC, a crystal oscillator OSC1, a band-pass filter BPF1 (frequency converter), limiter amplifier LIM (amplitude limiter), mixers MIXA1 and MIXB1, local oscillation signal generator LOG, oscillator OSC 2, low-pass filters LPFA and LPFB, limiter amplifiers LIMA and LIMB, differential filters DFA and DFB, mixers MIXA2 and MIXB2, a subtracter SUB, and a comparator CMP (orthogonal demodulator).

The mixer MIX mixes a high frequency FSK signal (having frequency of $f_{RF}$) received through the low-noise amplifier LNA and an output clock from the PLL circuit PC to output the mixed signal to the band-pass filter BPF1. The PLL circuit PC (second signal generator) generates an output clock based on a reference clock outputted from the crystal oscillator OSC1. The band-pass filter BPF1 removes unnecessary frequency components from the signal output from the mixer MIX with a predetermined frequency $f_{IF}$ being a center frequency $f_{o1}$ to output the filtered signal. The limiter amplifier LIM limits the amplitude of the output signal from the band-pass filter BPF1 to output the amplitude limited signal.

The mixer MIXA1 (I-side mixer) mixes an output signal from the limiter amplifier LIM and one of the LO signals (first local oscillation signal) from the local oscillation signal generator LOG to output the mixed signal to the low-pass filter LPFA. The mixer MIXB1 (Q-side mixer) mixes an output signal from the limiter amplifier LIM and the other of the LO signals from the local oscillation signal generator LOG to output the mixed signal to the low-pass filter LPFB. Based on a reference clock (having a frequency $F_{OSC2}$, where $F_{OSC2}=k \cdot f_{IF}$ and k is an odd integer equal to or greater than 3) output from the oscillator OSC2, the local oscillation signal generator LOG (first signal generator) generates a pair of LO signals (having a frequency $f_{LO}$, where $f_{LO}=k \cdot f_{IF}$) each of which is shifted 90° in phase. The k is 3, for example.

The low-pass filter LPFA removes unnecessary frequency components from the signals output from the mixer MIXA1 to output the filtered signal. The low-pass filter LPFB removes unnecessary frequency components form the signal output from the mixer MIXB1 to output the filtered signal. The limiter amplifier LIMA limits the amplitude of the output signal from the low-pass filter LPFA to output the amplitude limited signal in the same manner. The limiter amplifier LIMB limits the amplitude of the output signal from the low-pass filter LPFB to output the amplitude limited signal.

The differential filter DFA performs a differentiation process for the output signal from the limiter amplifier LIMA to output differentiated signal. In the same manner, the differential filter DFB performs a differentiation process for the output signal from the limiter amplifier LIMB to output a differentiated signal. The mixer MIXA2 mixes the output signal from the differential filter DFA and the output signal from the limiter amplifier LIMB to output the mixed signal. The mixer MIXB2 mixes the output signal from the differential filter DFB and the output signal from the limiter amplifier LIMA to output the mixed signal. The subtracter SUB performs a subtraction process for the output signal from the mixer MIXA2 and the output signal from the mixer MIXB2 to output the subtracted signal. The comparator CMP discriminates the output signal from the subtracter SUB to output a demodulation signal. Thus, the FSK receiver device RD1 adopts a scheme in which the demodulation signal is obtained by performing a differentiation and multiplication process for the output signals of the mixers MIXA1 and MIXB1 (Complex I/Q baseband signals). Here, the detailed operations of the differential filter DFA and DFB, mixers MIXA2 and MIXB2, the subtracter SUB, and the comparator CMP are disclosed in the above mentioned journal by John F. Wilson et al., so will not be further described.

Figure 2A:
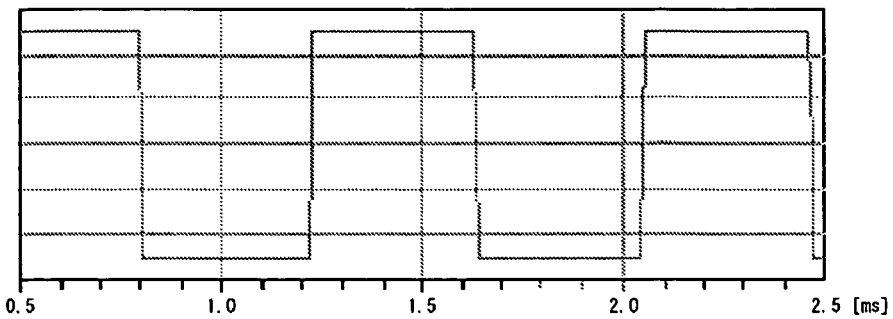
FIGS. 2(a) to 2(d) are waveform charts illustrating simulation results in the first embodiment.
Figure 2B:
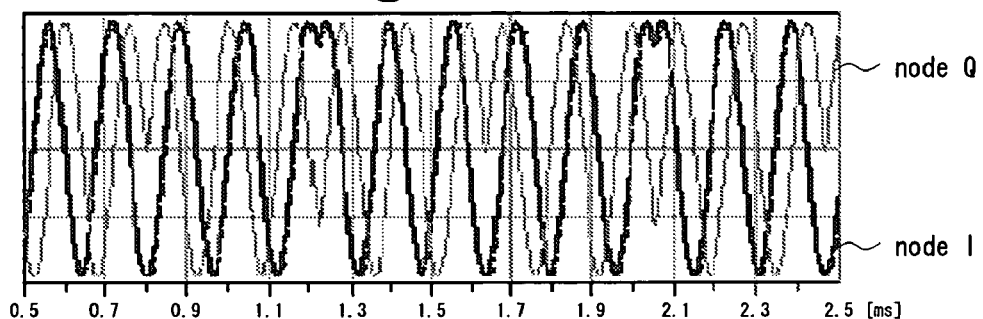
Figure 2C:
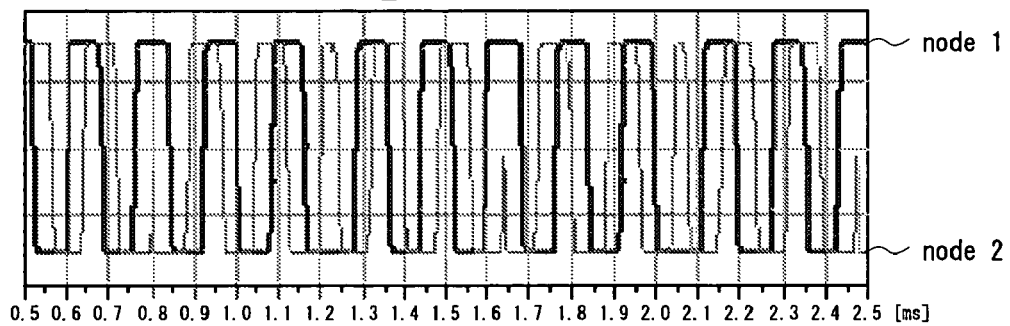
Figure 2D:
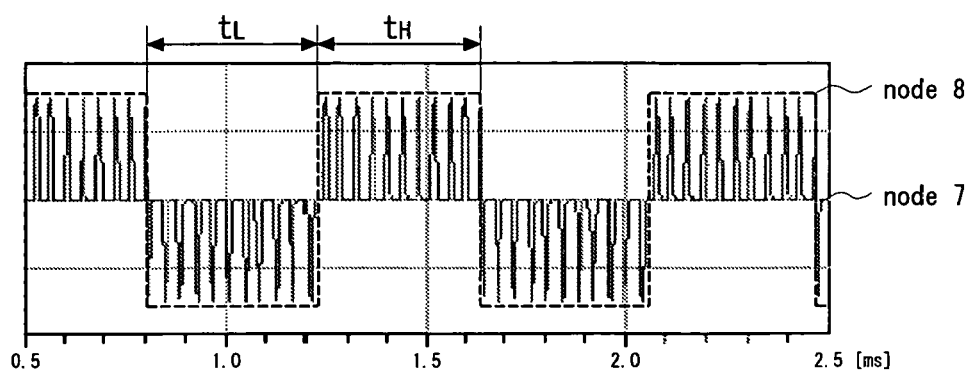

FIGS. 2(a) to 2(d) show simulation results in the first embodiment. FIG. 2(a) shows a signal waveform at the output node 0 of the limiter amplifier LIM. FIG. 2(b) shows a signal waveform (shown as a bold line) at the output node 1 of the mixer MIXA1 and a signal waveform (shown as a thin line) at the output node Q of the mixer MIXB1. FIG. 2(c) shows a signal waveform (shown as a bold line) at the output node 1 of the limiter amplifier LIMA and a signal waveform (shown as a thin line) at the output node 2 of the limiter amplifier LIMB. FIG. 2(d) shows a signal waveform (shown as a solid line) at the output node 7 of the subtracter SUB and signal waveform (shown as a dotted line) at the output node 8 of the comparator CMP. In FIGS. 2(a) to 2(d), the horizontal axis represents time (unit: millisecond).

In this example, the modulation index is 1.75 and k is 3. In the FSK receiver device RD1 (first embodiment) having above described configuration, since the number of the signal pulses generated at the output node 7 of the subtracter SUB can be increased even when the modulation index is small as shown in FIG. 2(d), the duty (ratio of a sum of the low level period $t_L$ and the high level period $t_H$ and the high level period $t_H$) of the signal generated at the output node 8 of the comparator CMP, i.e., the duty of the demodulation signal can be maintained constant at about 50%.

Figure 3:
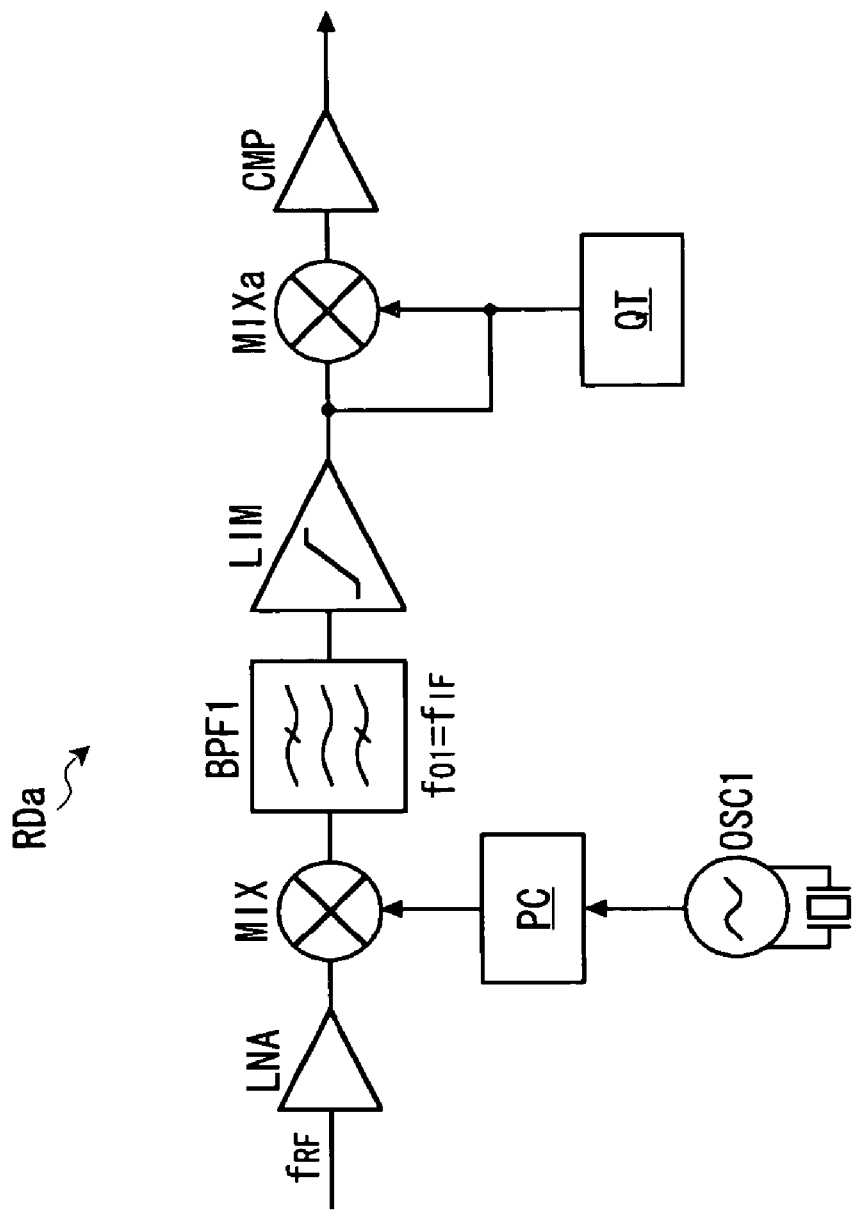
FIG. 3 is a block diagram illustrating a first comparative example of the present invention.

FIG. 3 shows a first comparative example of the present invention. In describing the first comparative example, the same element as that of the first embodiment will be denoted by the same reference numeral and the further description thereof will be omitted. An FSK receiver device RDa includes a low-noise amplifier LNA, a mixer MIX, a PLL circuit PC, a crystal oscillator OSC1, a band-pass filter BPF1, a limiter amplifier LIM, a mixer MIXa, an external phase shifter QT, and a comparator CMP. The mixer MIXa mixes an output signal from the limiter amplifier LIM and an output signal from the limiter amplifier LIM phase-shifted by the external phase shifter, and then outputs the mixed signal to the comparator CMP. In this manner, the FSK receiver device RDa adopts a scheme in which the demodulation signal is obtained by quadrature detection using the external phase shifter QT. In the FSK receiver device RDa (first comparative example) having such configuration, since the external phase shifter QT costs a lot, the cost of the FSK receiver device Rda is not reduced. In addition, the external phase shifter QT may need to be adjusted at the time of shipping the FSK receiver device RDa.

Figure 4:
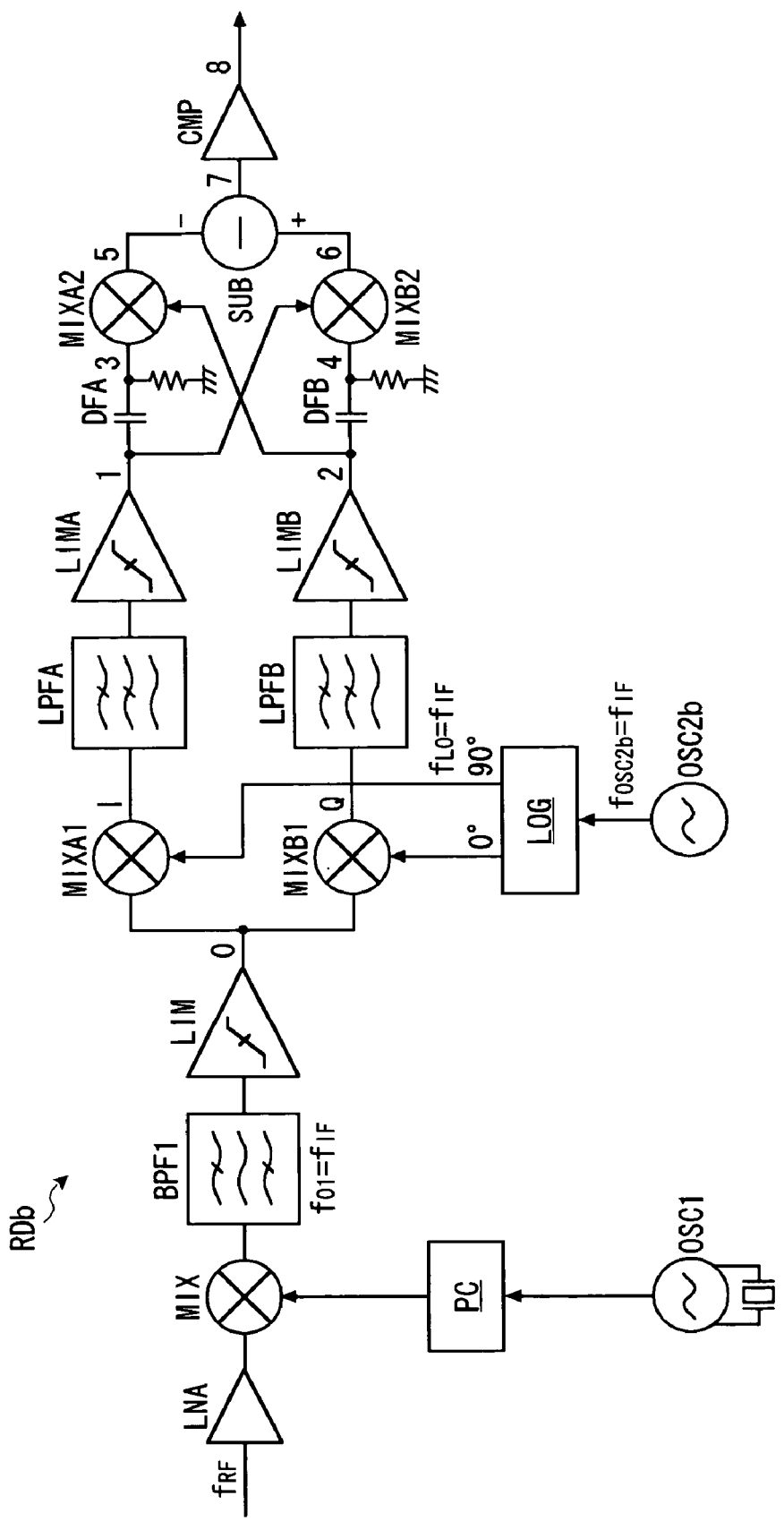
FIG. 4 is a block diagram illustrating a second comparative example of the present invention.

FIG. 4 shows a second comparative example of the present invention. In describing the second comparative example, the same element as that of the first embodiment will be denoted by the same reference numeral, and the further description thereof will be omitted. An FSK receiver device RDb has the same configuration as that of the FSK receiver device RD1 in the first embodiment except that the FSK receiver device RDb has an oscillator OSC2b instead of the oscillator OSC2 of the first embodiment. The oscillator OSC2b generates a reference clock whose frequency is 1/k of that of the oscillator OSC2. In other words, the reference clock output from the oscillator OSC2b has a frequency $f_{OSC2b}$ that is equal to the predetermined frequency $f_{IF}$.

Figure 5A:
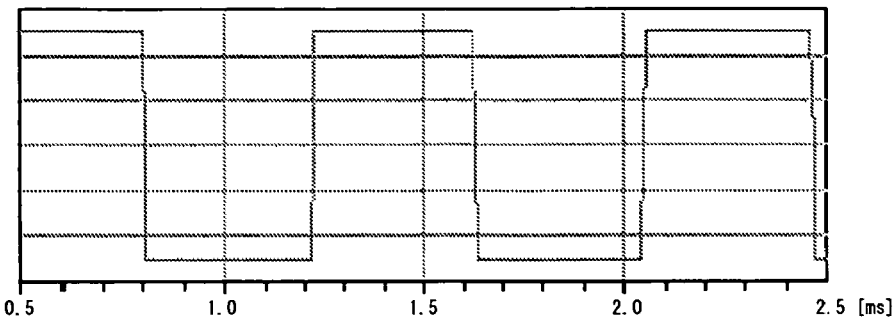
FIGS. 5(a) to 5(d) are waveform charts illustrating simulation results in the second comparative example.
Figure 5B:
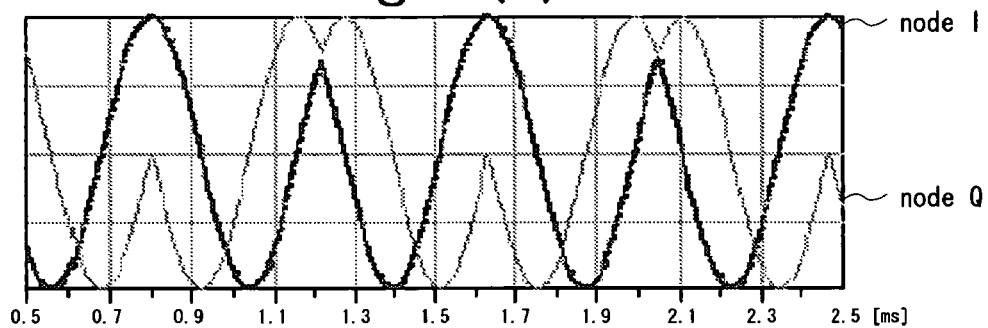
Figure 5C:
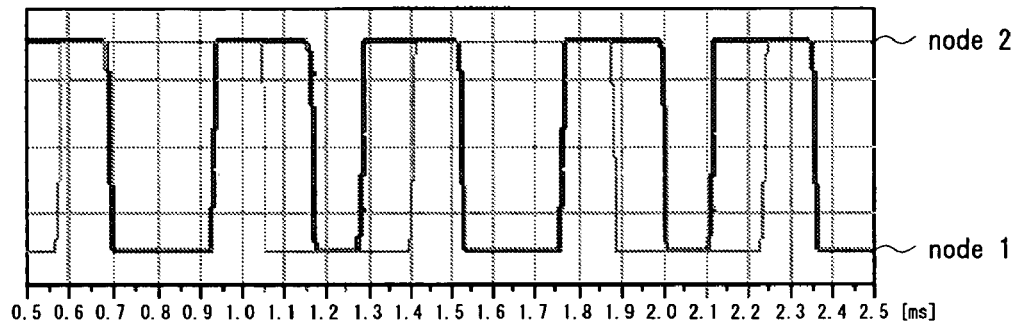
Figure 5D:
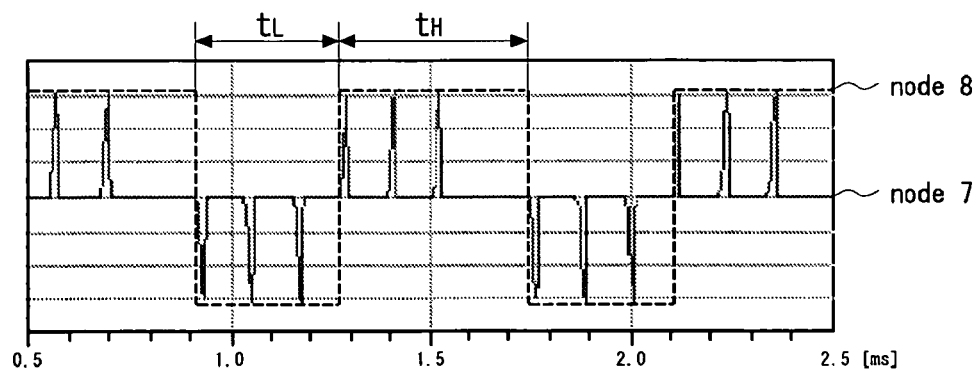
Figure 6A:
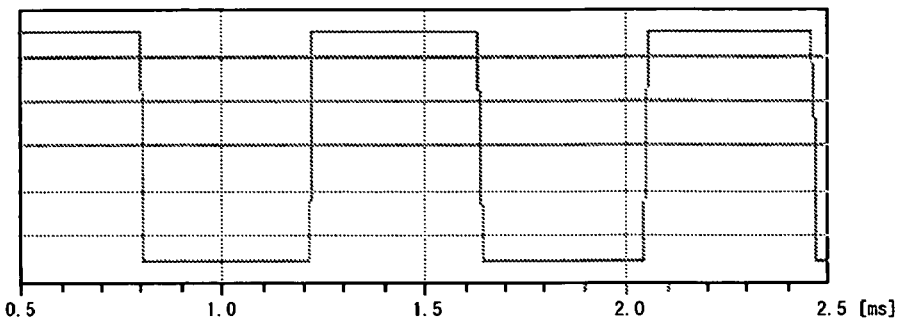
FIGS. 6(a) to 6(d) are waveform charts illustrating simulation results in the second comparative example.
Figure 6B:
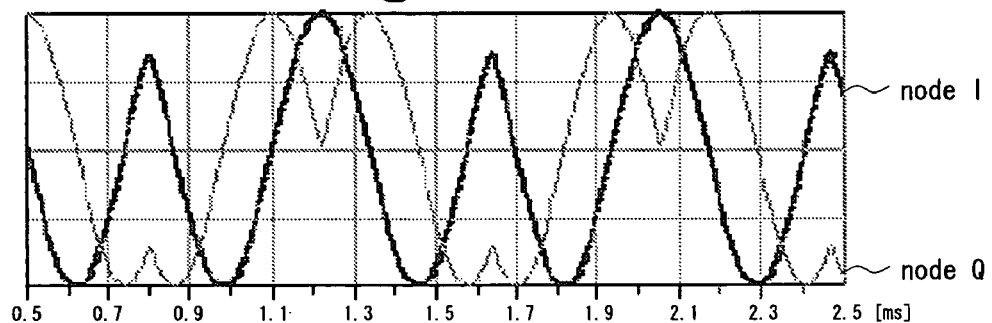
Figure 6C:
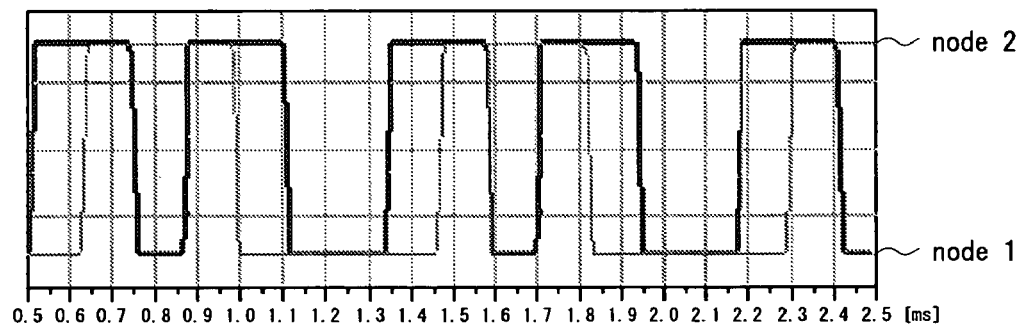
Figure 6D:
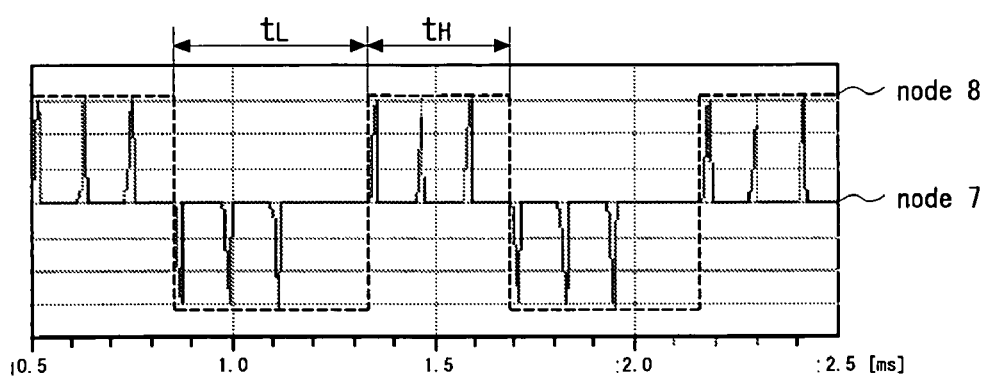

FIGS. 5(a) to 5(d) and 6(a) to 6(d) show the simulation results in the second comparative example, respectively. FIGS. 5(a) and 6(a) show a signal waveform at the output node 0 of the limiter amplifier LIM, respectively. FIGS. 5(b) and 6(b) show a signal waveform (shown as a bold line) at the output node 1 of the mixer MIXA1, and a signal waveform (shown as a thin line) at the output node Q of the mixer MIXB1, respectively. FIGS. 5(c) and 6(c) show a signal waveform (shown as a bold line) at the output node 1 of the limiter amplifier LIMA, and a signal waveform (shown as a thin line) at the output node 2 of the limiter amplifier LIMB, respectively. FIGS. 5(d) and 6(d) show a signal waveform (shown as a solid line) at the output node 7 of the subtracter SUB, and a signal waveform (shown as a dotted line) at the output node 8 of the comparator CMP, respectively. In FIGS. 5(a) to 5(d) and 6(a) to 6(d), the horizontal axis represents time (unit: millisecond). In this example, the modulation index is 1.75, similar to FIG. 2. The phases of LO signals of the local oscillation signal generator LOG and the phase of the output signal of the limiter amplifier LIM in FIG. 5 are different from those in FIG. 6. In the FSK receiver device RDb (second comparative example) having above mentioned configuration, since the smaller the modulation index becomes, the number of pulses of the signal generated at the output node 7 of the subtracter SUB decreases as shown in FIGS. 5(d) and 6(d), variation occurs in duty of the signals generated at the output node 8 of the comparator CMP, i.e., the demodulation signal.

As mentioned above, in the first embodiment, by setting the frequency of the LO signals of the local oscillation signal generator LOG to k multiple of the predetermined frequency $f_{IF}$, the k-th order harmonics component of the output signal from the limiter amplifier LIM is used to generate the demodulation signal. Since this is equivalent to multiplying the modulation index by k, it is possible to suppress variation in the demodulation signal even when the modulation index is small. In addition, since a multiplier for multiplying the output signal from the limiter amplifier LIM by k is not required, it is possible to improve the accuracy of the demodulation signal at low cost. As a result, it is possible to contribute to high quality and economization of the FSK communication system.

Figure 7:
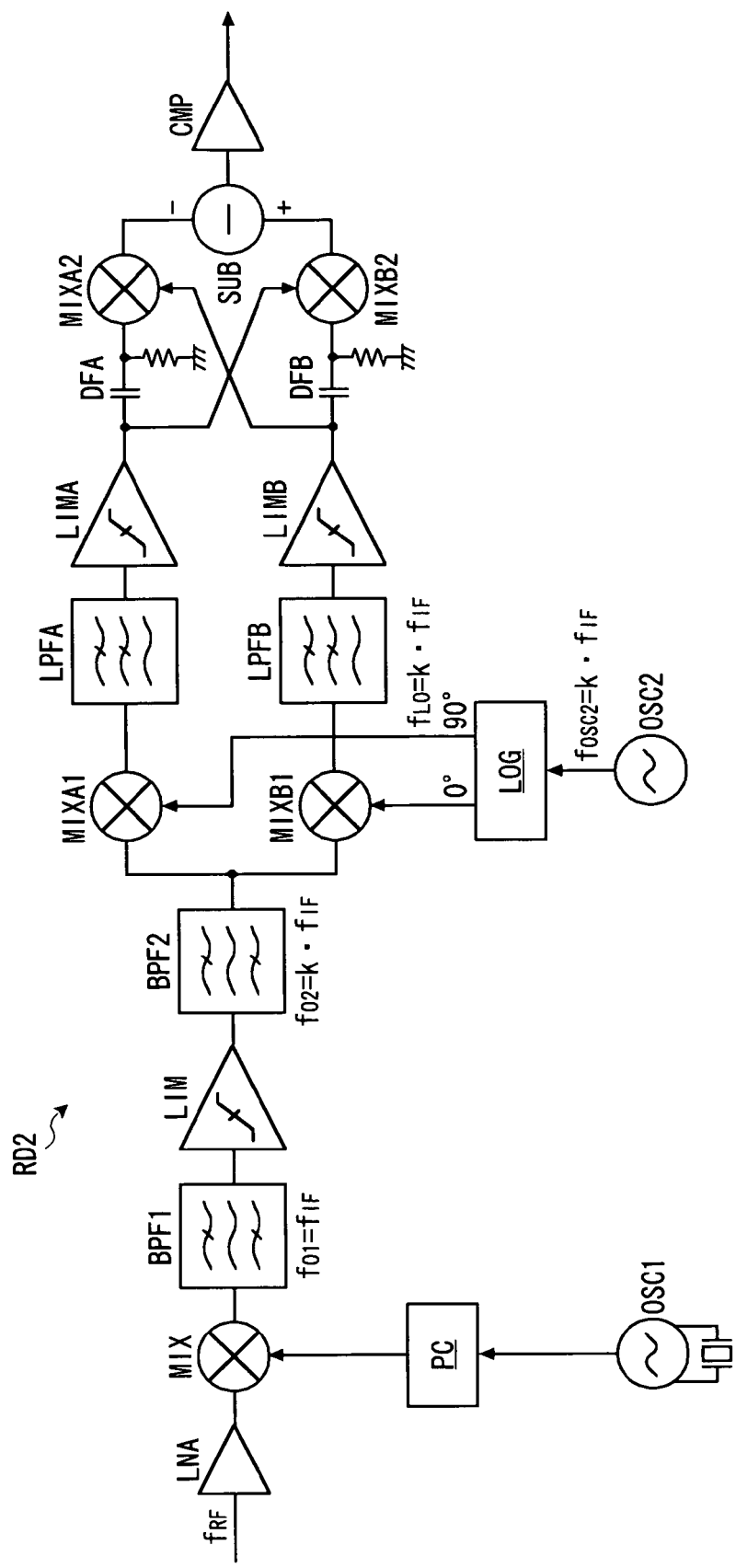
FIG. 7 is a block diagram illustrating a second embodiment of the receiver device according to the present invention.

FIG. 7 shows a receiver device according to a second embodiment of the present invention. In describing the second embodiment, the same element as that of the first embodiment will be denoted by the same reference numeral, and the further description thereof will be omitted. An FSK receiver device RD2 is constructed by adding a band-pass filter BPF2 to the FSK receiver device RD1 in the first embodiment. The band-pass filter BPF2 is provided between the limiter amplifier LIM and mixers MIXA1 and MIXB1. For example, the center frequency $f_{o2}$ of the band-pass filter BPF2 is k multiple of the predetermined frequency $f_{IF}$.

The amplitude of the harmonics component of the output signal of the limiter amplifier LIM becomes smaller gradually as the order of the harmonics component goes up. For this reason, the harmonics components other than the k-th order harmonics component, in particular, the lower order harmonics components than k are apt to interfere. Because the harmonics components are sufficiently separated from each other, it is possible to remove unnecessary harmonics components by forming a simple band-pass filter BPF2 having 1-th or 2-th order. In the second embodiment, it is possible to attain the same effect as in the first embodiment. Furthermore, it is possible to remove unnecessary harmonics components in the previous stage of mixers MIXA1 and MIXB1 (in other words, previous stage of I/Q down converter), thereby contributing to the improvement in accuracy of the demodulation signal.

Figure 8:
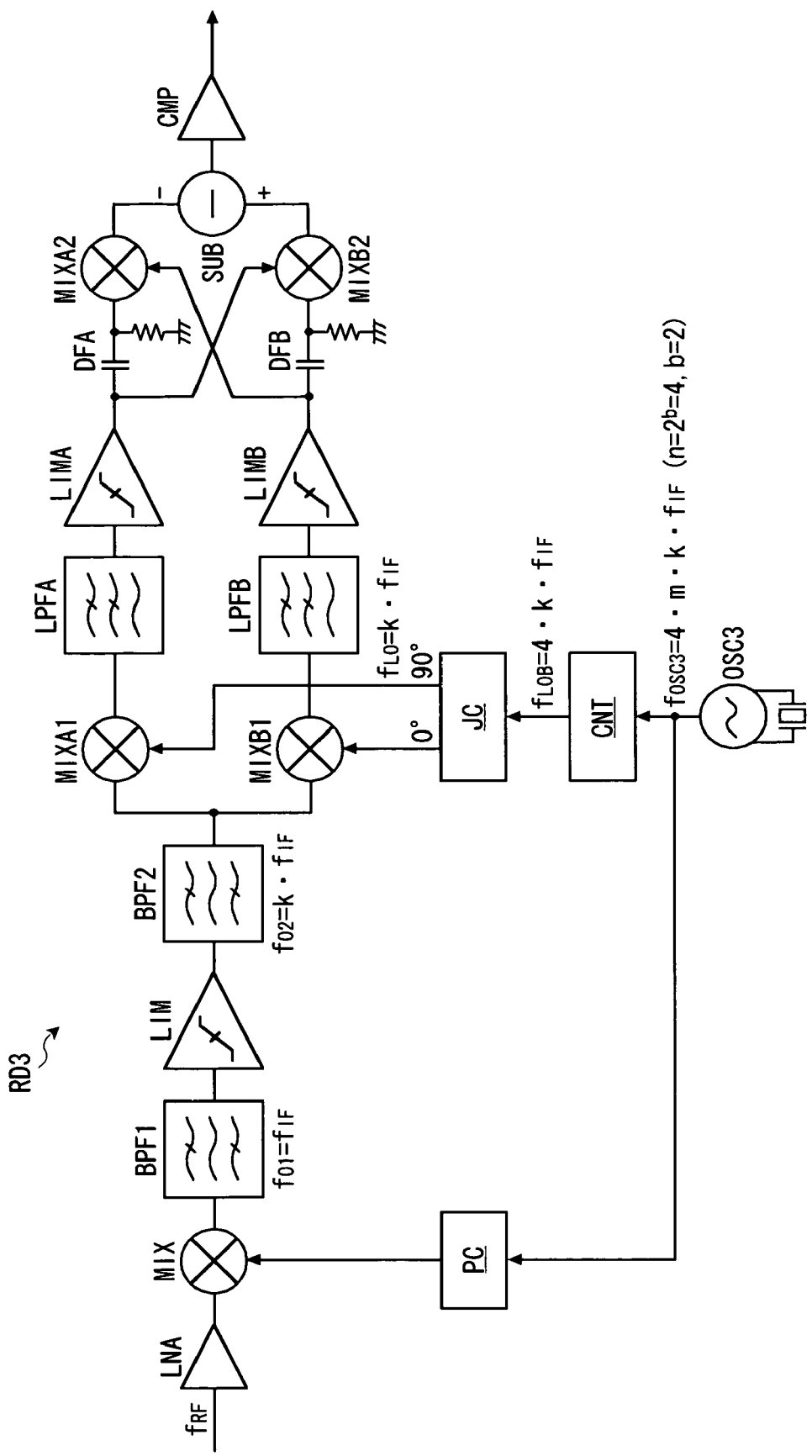
FIG. 8 is a block diagram illustrating a third embodiment of the receiver device according to the present invention.

FIG. 8 shows a receiver device according to a third embodiment of the present invention. In describing the third embodiment, the same element as those of the first and second embodiments will be denoted by the same reference numeral, and the further description thereof will be omitted. An FSK receiver device RD3 has the same configuration as that of the FSK receiver device RD1 in the first embodiment except that the FSK receiver device RD3 has a crystal oscillator OSC3 instead of the oscillators OSC1 and OSC2 of the first embodiment, and a counter CNT (divider) and a Johnson counter JC (phase shifter) instead of the local oscillation signal generator LOG of the first embodiment. The crystal oscillator OSC3 generates a reference clock (basic oscillation signal) whose frequency $f_{OSC3}$ is $n \cdot m \cdot k \cdot f_{IF}$ (where, m and n are integers equal to or greater than 2). Here, n is b-th power of 2 (b is a positive integer), for example, 4 (namely, b is 2).

The counter CNT performs a counting operation in synchronization with the reference clock output from the crystal oscillator OSC3. The counter CNT outputs a one-shot pulse signal, for example, to the Johnson counter every time the counter performs m counting operations. Therefore, the frequency $f_{LOB}$ of the output signal from the counter CNT is 1/m of the reference clock from the crystal oscillator OSC3 (in other words, $f_{LOB}=f_{OSC3}/4=4 \cdot k \cdot f_{IF}$). A two-bit Johnson counter JC has bits JC0 to JC1 and performs counting operations in synchronization with the transitions (for example, the rising edges) of the output signal of the counter CNT. The Johnson counter JC outputs the bit value signals of bits JC0 and JC1 as the LO signals to mixers MIXA1 and MIXB1.

Figure 9:
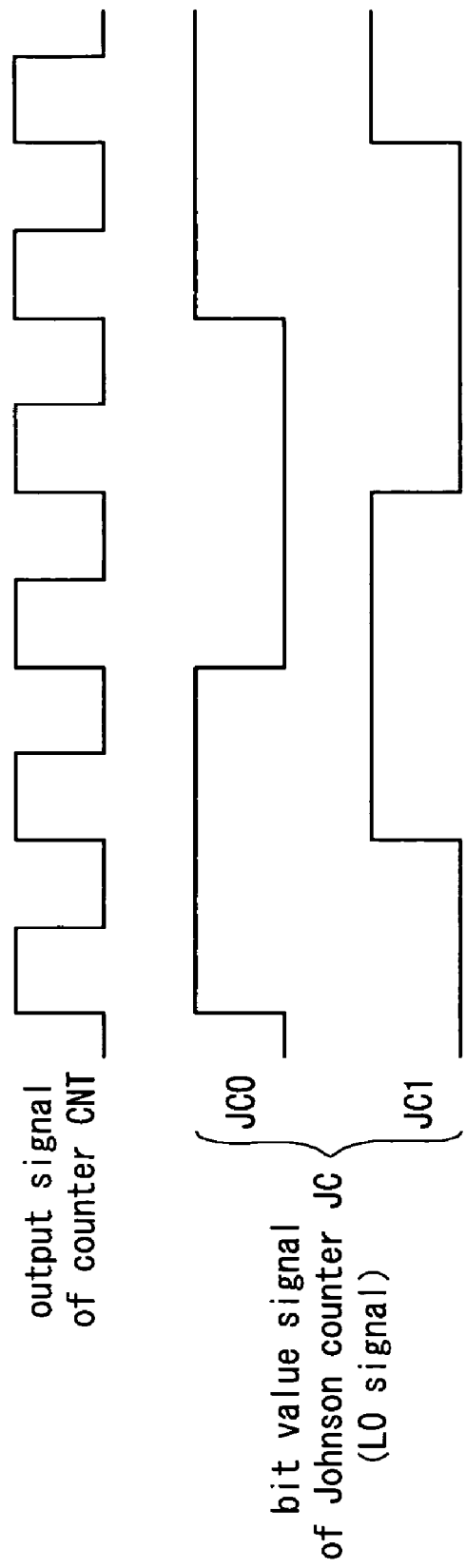
FIG. 9 is a timing chart illustrating operations of Johnson counter in FIG. 8.

FIG. 9 shows the operation of Johnson counter in FIG. 8. Both of the bit value signals of bits JC0 and JC1 in the Johnson counter JC have frequencies, each of which is equal to ¼ ($f_{LO}=k \cdot f_{IF}$) of the output signal from the counter CNT and is shifted exactly 90° in phase. Therefore, it is possible to use the bit value signals of the bits JC0 and JC1 of the Johnson counter JC as LO signals to mixers MIXA1 and MIXB1, respectively.

In the third embodiment, it is also possible to attain the same effect as in the first and second embodiments. In addition, it is possible to communize the reference clock that is used to generate LO signals to mixers MIXA1 and MIXA2 and the output clock of the PLL circuit PC. As a result, it is possible to reduce cost as compared to a case in which separate oscillators are provided to the PLL circuit PC and mixers MIXA1 and MIXA2, respectively. In addition, since the Johnson counter JC performs counting operations in synchronization with the rising edges of the output signal from counter CNT, it is possible to make the duty of LO signals to mixers MIXA1 and MIXB2 exactly 50%, irrespective of the duty of the output signal from counter CNT.

Figure 10:
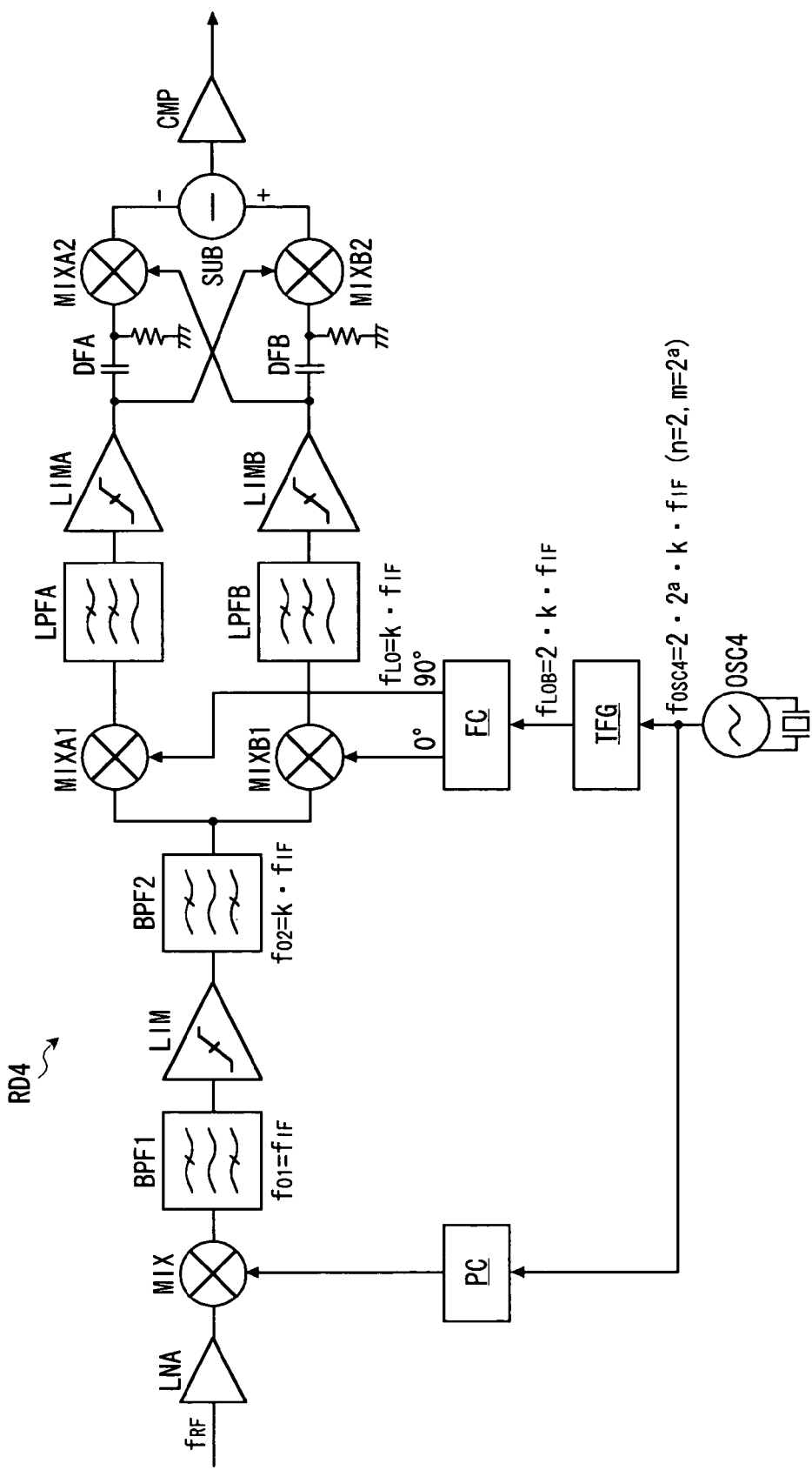
FIG. 10 is a block diagram illustrating a fourth embodiment of the receiver device according to the present invention.

FIG. 10 shows a receiver device according to a fourth embodiment of the present invention. In describing the fourth embodiment, the same element as those of the first to third embodiments will be denoted by the same reference numeral, and the further description thereof will be omitted. An FSK receiver device RD4 has the same configuration as that of the FSK receiver device RD3 in the third embodiment except that the FSK receiver device RD4 has a crystal oscillator OSC4, a toggle type flip-flop group TFG (divider) and a FF circuit FC (a phase shifter) instead of the crystal oscillator OSC3, the counter CNT and the Johnson counter JC of the third embodiment.

The crystal oscillator OSC4 generates a reference clock (basic oscillation signal) whose frequency $f_{OSC4}$ is $n \cdot m \cdot k \cdot f_{IF}$ (where m and n are integers equal to or greater than 2). Here, m is a-th power of 2 (where a is an integer equal to or greater than 2) and n is 2. The toggle type flip-flop group TFG is constructed by connecting 'a' toggle type flip-flops in cascade. The toggle type flip-flop in the first stage receives the reference clock output from the crystal oscillator OSC4 at a trigger input terminal thereof. Other toggle type flip-flops receive output signals from the toggle type flip flop in the preceding stages at trigger input terminals thereof. The toggle type flip-flop in the last stage outputs the output signal to the FF circuit FC. As a result, the frequency $f_{LOB}$ of the output signal (divided oscillation signal) from the toggle type flip-flop group TFG is 1/(a-th power of 2) (in other words, $f_{LOB}=2 \cdot k \cdot f_{IF}$) of the reference clock output from the crystal oscillator OSC4.

The FF circuit FC is a typical phase shifter constructed by using a flip-flop. The FF circuit FC inverts one (first output signal) of the LO signals to the mixers MIXA1 and MIXB1 in synchronization with the rising edges of the output signal (the output signal from the toggle type flip-flop in the last stage) from the toggle type flip-flop group TFG. The FF circuit FC inverts the other (second output signal) of the LO signals to the mixers MIXA1 and MIXB1 in synchronization with the falling edges of the output signal from the toggle type flip-flop group TFG. Since the duty of the output signal from the toggle type flip-flop group TFG is exactly 50%, the LO signals to mixers MIXA1 and MIXB1 have frequencies, each of which is equal to ½ ($f_{LO}=k \cdot f_{IF}$) of the output signal from the toggle type flip-flop group TFG and is shifted exactly 90° in phase. In the fourth embodiment, it is also possible to attain the same effect as in the first to third embodiments. In addition, because the number 'a' of cascade-connected toggle type flip-flops are used, as compared to a case in which a single counter is used (the third embodiment), it is possible to simplify the circuit configuration, thereby contributing to reducing the cost.

Further, although the descriptions have been made on the case in which the band-pass filter BPF2 is provided between the limiter amplifier LIM and mixers MIXA1 and MIXB1 in the second to fourth embodiments, it is to be understood that the present invention is not limited thereto. For example, it is also possible to provide between the limiter amplifier LIM and mixers MIXA1 and MIXB1 a high-pass filter having a pass band including the predetermined frequency $f_{IF}$ (for example, having a cutoff frequency $f_c$, $f_c \cong (k-1) \cdot f_{IF}$).

Furthermore, although the descriptions have been made on the case where n is 4 (2-th power of 2) and the 2-bit Johnson counter JC is provided as a phase shifter in the third embodiment, it is to be understood that the present invention is not limited thereto. For example, it is also possible to provide a b-bit Johnson counter (where b is a positive integer excluding 2) by varying the dividing ratio (in other words, m) of the counter CNT.

Figure 11:
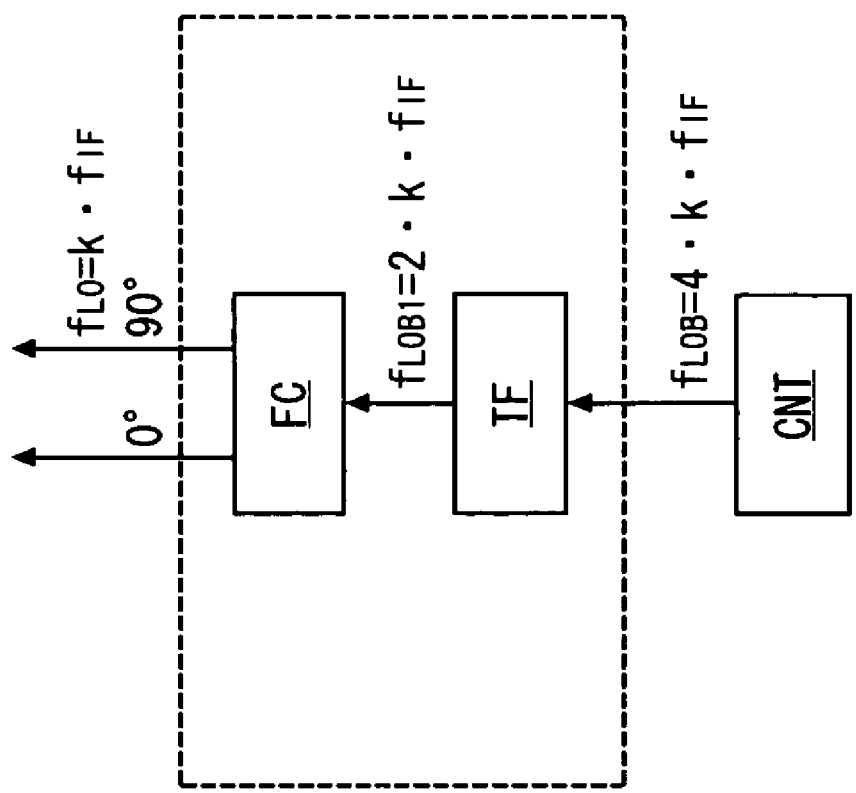
FIG. 11 is a block diagram illustrating a modified example of the third embodiment.

In addition, although the descriptions have been made on the case where n is 4 and the phase shifter is constructed by 2-bit Johnson counter JC in the third embodiment, it is to be understood that the present invention is not limited thereto. For example, as shown in FIG. 11, instead of the 2-bit Johnson counter JC, the phase shifter can be constructed by connecting one toggle type flip-flop TF and the FF circuit FC (FIG. 10) of the fourth embodiment in cascade.

Moreover, although the descriptions have been made to the case where m is a-th power of 2 (where a is an integer equal to or greater than 2) and a-number of cascade-connected toggle type flip-flops (toggle type flip-flop group TFG) are provided in the fourth embodiment, it is to be understood that the present invention is not limited thereto. For example, it is also possible that when m is 2, one toggle type flip flop may be substituted in place of the toggle type flip-flop group TFG, such that it receives the reference clock from the crystal oscillator OSC4 at the trigger input terminal thereof and outputs an output signal to the FF circuit FC.

The invention is not limited to the above embodiments and various modifications may be made without departing from the spirit and scope of the invention. Any improvement may be made in part or all of the components.

What is claimed is:

1. A receiver device comprising:
    a frequency converter which converts a high frequency signal transmitted in a frequency shift keying scheme into an intermediate frequency signal having a predetermined frequency, to output said intermediate frequency signal therefrom;
    an amplitude limiter which limits an amplitude of an output signal from said frequency converter for output;
    an orthogonal demodulator which includes: a first signal generator which generates a pair of first local oscillation signals of which frequencies are k multiple of said predetermined frequency and of which phases are orthogonal to each other, k being an odd integer equal to or greater than 3; and I-side and Q-side mixers each of which mixes an output signal from said amplitude limiter and each of said pair of first local oscillation signals to output a mixed signal therefrom, said orthogonal demodulator generating a demodulation signal based on output signals from said I-side and Q-side mixers; and
    an oscillator which generates a basic oscillation signal having a frequency of n·m·k multiple of said predetermined frequency, m and n being integers equal to or greater than 2, wherein:
    said frequency converter includes: a second signal generator which generates a second local oscillation signal based on said basic oscillation signal; and a mixer which mixes said high frequency signal and said second local oscillation signal to output a mixed signal therefrom; and
    said first signal generator includes: a divider which divides said basic oscillation signal by m to output a divided signal as a divided oscillation signal; and a phase shifter which generates said first local oscillation signals by dividing said divided oscillation signals by n.

2. The receiver device according to claim 1, wherein said divider includes a counter performing a counting operation in synchronization with said basic oscillation signal, and outputs, as said divided oscillation signal, a signal inverted every time said counter performs m counting operations.

3. The receiver device according to claim 1, wherein:
    said m is a-th power of 2, a being an integer equal to or greater than 2; and
    said divider includes a number 'a' of toggle type flip-flops connected in cascade, and inputs said basic oscillation signal to a first-stage toggle type flip-flop of said toggle type flip-flops and then outputs a signal output from a last-stage toggle type flip-flop of said toggle type flip-flops as said divided oscillation signal.

4. The receiver device according to claim 1, wherein said m is 2; and
said divider includes a toggle type flip-flop inverting an output signal in synchronization with said basic oscillation signal, and outputs the output signal from said toggle type flip-flop as said divided oscillation signal.

5. The receiver device according to claim 1, wherein:
said n is b-th power of 2, b being a positive integer; and
said phase shifter includes a b-bit Johnson counter performing a counting operation in synchronization with said divided oscillation signal, and generates said first local oscillation signals based on bit value signals of said Johnson counter.

6. The receiver device according to claim 1, wherein:
said n is 4; and
said phase shifter includes a toggle type flip-flop which inverts an output signal in synchronization with said basic oscillation signal and a flip-flop circuit which inverts first and second output signals in synchronization with rising and falling edges of the output signal from said toggle type flip-flop, respectively;
said phase shifter generates said first local oscillation signals based on said first and second output signals from said flip-flop circuit.

7. The receiver device according to claim 1, wherein:
said n is 2; and
said phase shifter includes a flip-flop circuit inverting first and second output signals in synchronization with said rising and falling edges of said divided oscillation signal, and generates said first local oscillation signals based on said first and second output signals from said flip-flop circuit.

8. The receiver device according to claim 1, further comprising:
a band-pass filter provided between said amplitude limiter and said orthogonal demodulator and having a center frequency which is k multiple of said predetermined frequency.

9. The receiver device according to claim 1, further comprising:
a high-pass filter provided between said amplitude limiter and said orthogonal demodulator and having a pass band including a frequency which is k multiple of said predetermined frequency.

10. The receiver device according to claim 1, wherein
said orthogonal demodulator generates said demodulation signal by using a harmonics component of said intermediate frequency signal which matches the frequencies of the first local oscillation signals.

* * * * *